Jan. 13, 1953        M. J. WEINBERG         2,624,941
          MACHINE FOR MAKING PATS OR CHIPS
                FROM PLASTIC BULK MATERIAL
Filed Sept. 13, 1947                    8 Sheets-Sheet 1

Inventor
Maurice J. Weinberg
By
J. B. Felshin
Attorney

Jan. 13, 1953

M. J. WEINBERG 2,624,941

MACHINE FOR MAKING PATS OR CHIPS
FROM PLASTIC BULK MATERIAL

Filed Sept. 13, 1947

INVENTOR
*Maurice J. Weinberg*
BY
*J. B. Felshin*
ATTORNEY

Jan. 13, 1953 M. J. WEINBERG 2,624,941
MACHINE FOR MAKING PATS OR CHIPS
FROM PLASTIC BULK MATERIAL
Filed Sept. 13, 1947 8 Sheets-Sheet 4

INVENTOR
Maurice J. Weinberg
BY
J. B. Feldman
ATTORNEY

Inventor
Maurice J. Weinberg

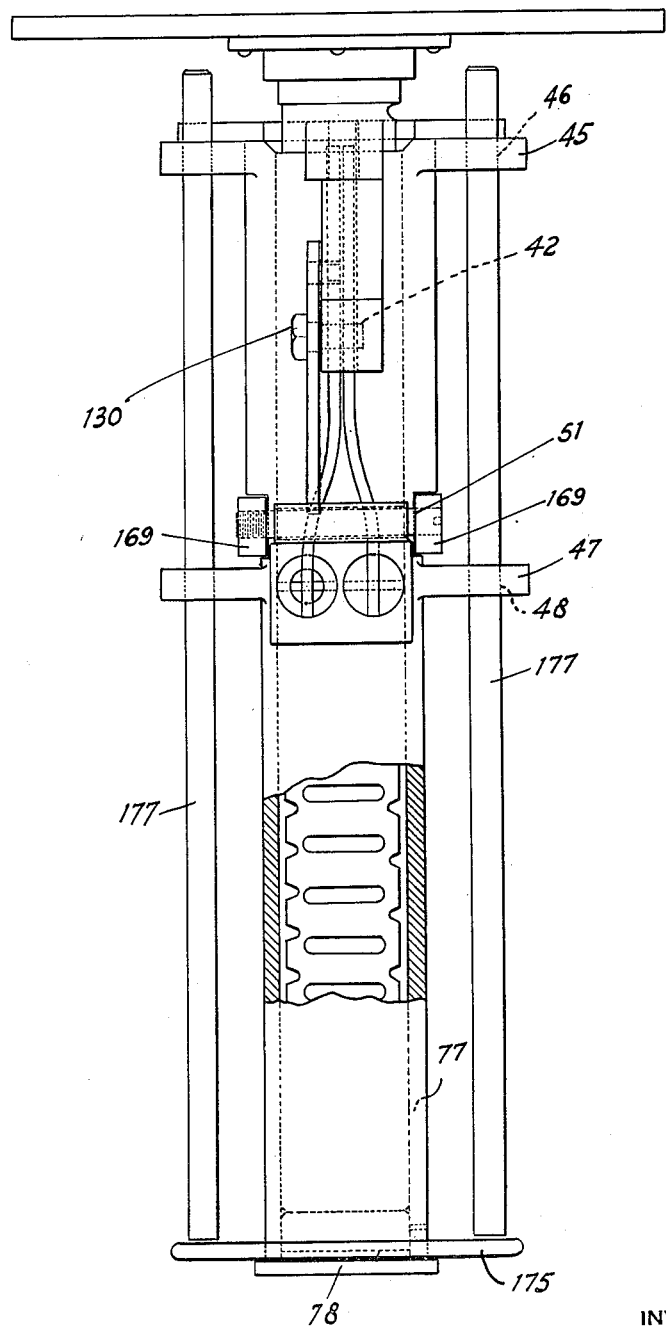

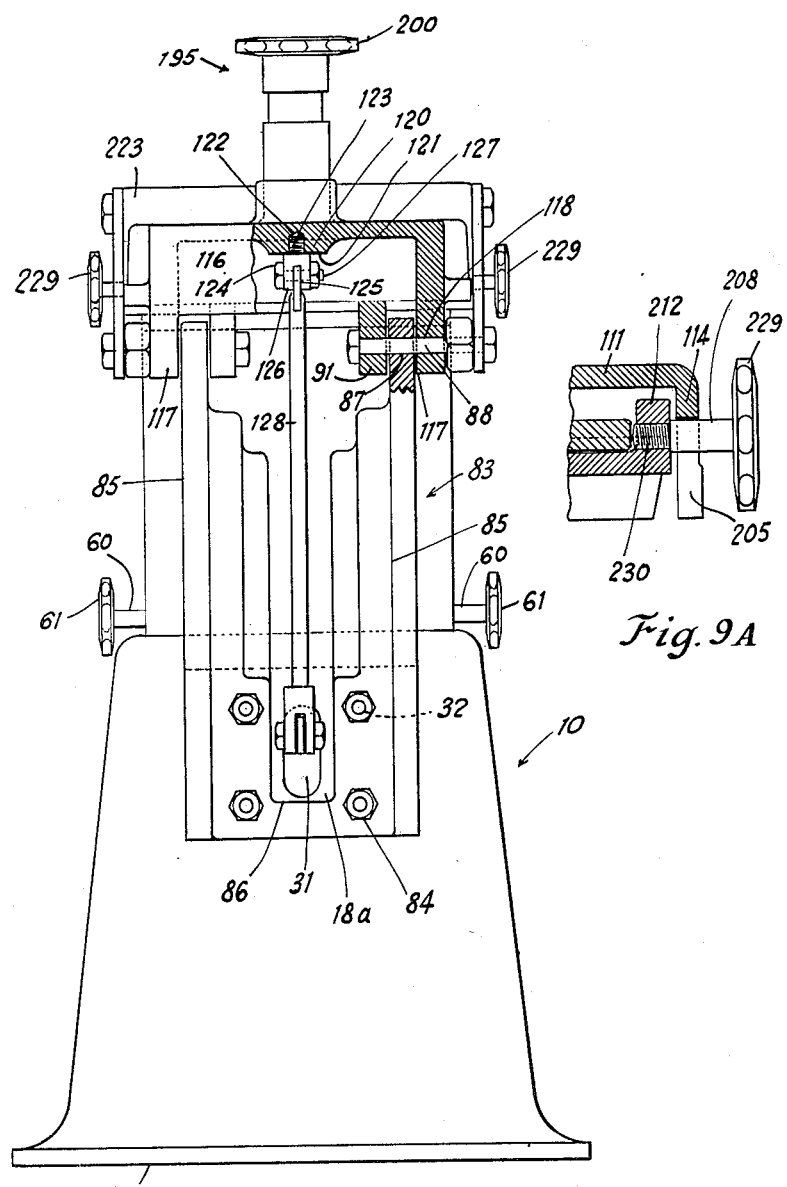

Patented Jan. 13, 1953

2,624,941

UNITED STATES PATENT OFFICE 2,624,941

MACHINE FOR MAKING PATS OR CHIPS FROM PLASTIC BULK MATERIAL

Maurice J. Weinberg, New York, N. Y.

Application September 13, 1947, Serial No. 773,817

32 Claims. (Cl. 31—7)

This invention relates to machine for making pats or chips from plastic bulk material. It is particularly directed to a machine for making butter or margerine or the like chips or pats. More particularly, it is directed to a device adapted to receive a block of butter or other soft material, said machine being provided with means to divide predetermined thicknesses at the upper end of the block, into pats or chips, the machine being so constructed that said thickness is exposed or projects above a chamber so that it may be severed as a slab comprising said chips or pats.

An object of this invention is to provide a machine of the character described comprising a stand, a chamber on the stand open at the top and adapted to receive a block of butter or other material, a platform or piston at the lower end of the chamber, a stem on the piston and extending downwardly therefrom, into the stand, a cover pivoted relative to the stand, and swingable into position overlying the chamber, ratchet means on the stem, an impressor plate within the cover, and means connected to the cover for raising the piston or platform a predetermined height each time the cover is swung up from the chamber.

Another object of this invention is to provide in a machine of the character described means to vary the height that the piston or platform is raised each time the cover is swung up, whereby to vary the thickness of the slab to be cut.

Another object of this invention is to provide in a machine of the character described, an impressor plate for impressing the top layer of the block, said impressor plate being removably mounted in the cover, whereby different impressor plates may be mounted on the machine, so as to permit varying the number of pats per slab.

Still a further object of this invention is to provide in a machine of the character described, a heating element removably mounted within the cover and adjacent the impressor plate.

A further object of this invention is to provide in a machine of the character described, a cover hinged to the machine, an impressor plate mounted on the cover for sliding movement relative thereto, and a handle pivoted to the machine on the same axis with the cover, and means to connect the handle to the impressor plate whereby initial movement of the handle will cause swinging movement of the cover into overlying position relative to the chamber, and continued rotation of the handle will cause vertical movement of the impressor plate relative to the cover and butter chamber, so that the actual cutting of the butter is on a straight line and not on an arc, whereby the butter is not mutilated as it is impressed or cut.

Another object of this invention is to provide in a machine of the character described, a butter chamber, a platform or piston therein, a post or piston rod extending from said platform or piston, said post being of polygonal cross-section and having ratchet notches on each face thereof, the distance between the notches on each face being different from the differences between the notches in the other faces, said platform and its post being removable from the chamber so that it may be turned to bring any face of the post to a predetermined plane, a holding pawl pivoted to the machine adapted to engage the notches in the face of the post which is in said predetermined plane, for holding said post in any position to which it is lifted, and a lifting pawl connected to the cover and adapted to engage a notch in said face and raise the post upon moving the cover, the construction being such that closing movement of the cover will lower the lifting pawl to engage the next lower notch and when the cover is again lifted the post and hence the platform will also be lifted.

In accordance with the present invention, the lift of the lifting pawl is greater than the longest distance between ratchet grooves on any face of the post, but less than twice the distance between adjacent ratchet grooves on any other face of the post, so that the post will not be lifted a double step at one operation of the cover.

Still a further object of this invention is to provide in a machine of the character described, means to withdraw both pawls at once from engagement with respect to the post so that the post can be lifted or dropped manually as desired.

Yet another object of this invention is to provide in a machine of the character described, a fixed cylinder to receive the lower end of the post so that when the platform is allowed to drop, it will do so gently, the air trapped in the bottom of the cylinder serving as an air cushion, and the cylinder being provided with an air escape opening to allow the post to settle to a lower level.

A yet further object of this invention is to provide in a machine of the character described, means to permit the post to be quickly and easily lifted by hand after releasing both pawls from engagement with the post.

A still further object of this invention is to provide a machine of the character described in which the butter chamber is easily removable for cleaning.

The device embodying the invention is sanitary since it is all mechanical except for the heater which can be removed. Thereafter, the remainder of the device may be easily washed or dipped in water and there is nothing in the machine that would go out of order during washing or dipping. For this reason, the device can be kept sanitary and washed without disturbing or hindering its operation.

Yet a further object of this invention is to provide in a device of the character described, means to sever from a block of material for making pats, an imprinted slab divided into pats.

A yet further object of this invention is to provide in a machine of the character described, a spreader placement or positioning frame hinged to the stand and movable into overlying position relative to the butter chamber, so as to be disposed between the cover and the butter chamber, said spreader frame being provided with intersecting spreader blades or wires or cutters to divide the butter block or bulk into sections as the block is pressed upwardly by the piston. The advantage of the spreader frame is as follows:

A. The spreader frame positions and retains the butter and holds it down.

B. It cuts the butter bulk into two or more pieces.

C. The spreader frame resists adhesion of butter to the impressor plate as the impressor plate is lifted up after impressing or cutting the top layer of the butter into pats.

D. The spreader frame resists lifting of the butter in the butter chamber when the remover frame cuts a top slab at the top of the bulk.

E. The impressor plate can be made without intersecting blades, thereby removing possibility of cavity suction or adhesion in the impressor plate which has heretofore been troublesome, and also allowing easy and rapid escape of air which might otherwise be trapped by the intersecting blades.

F. The butter bulk is held centrally positioned by the spreader frame should the butter bulk be less than the volume of the butter chamber.

Still a further object of this invention is to provide an impressor plate or head formed with blades for dividing the top slab into pats, said impressor plate being constructed without a perimeter blade, and all of the blades in the impressor plate being formed with notches or grooves in order that butter pats are formed which are bonded together by the butter in the notches or grooves. The bonded or interconnecting portions facilitate removal of the pats and transfer of the slab, and such interconnecting portions further serve to resist fusion in the pats and keep them spaced from each other during cutting and removing operation.

A still further object of this invention is to provide a strong, rugged and durable machine of the character described, which shall be relatively inexpensive to manufacture, sure and positive in operation, and yet practical and efficient to a high degree in use.

Other objects of this invention will in part be obvious and in part hereinafter pointed out.

The invention accordingly consists in the features of construction, combinations of elements, and arrangement of parts which will be exemplified in the construction hereinafter described, and of which the scope of application will be indicated in the following claims.

In the accompanying drawing, in which is shown various possible illustrative embodiments of this invention, Fig. 1 is a side elevational view of a machine embodying the invention, with the cover closed, and with parts broken away and in cross-section;

Fig. 8 is a rear elevational view of the platform or piston, the lifting and holding pawls and the rods for lifting the platform;

Fig. 9 is a rear elevational view of the machine with parts broken away and in cross-section;

Figure 1:
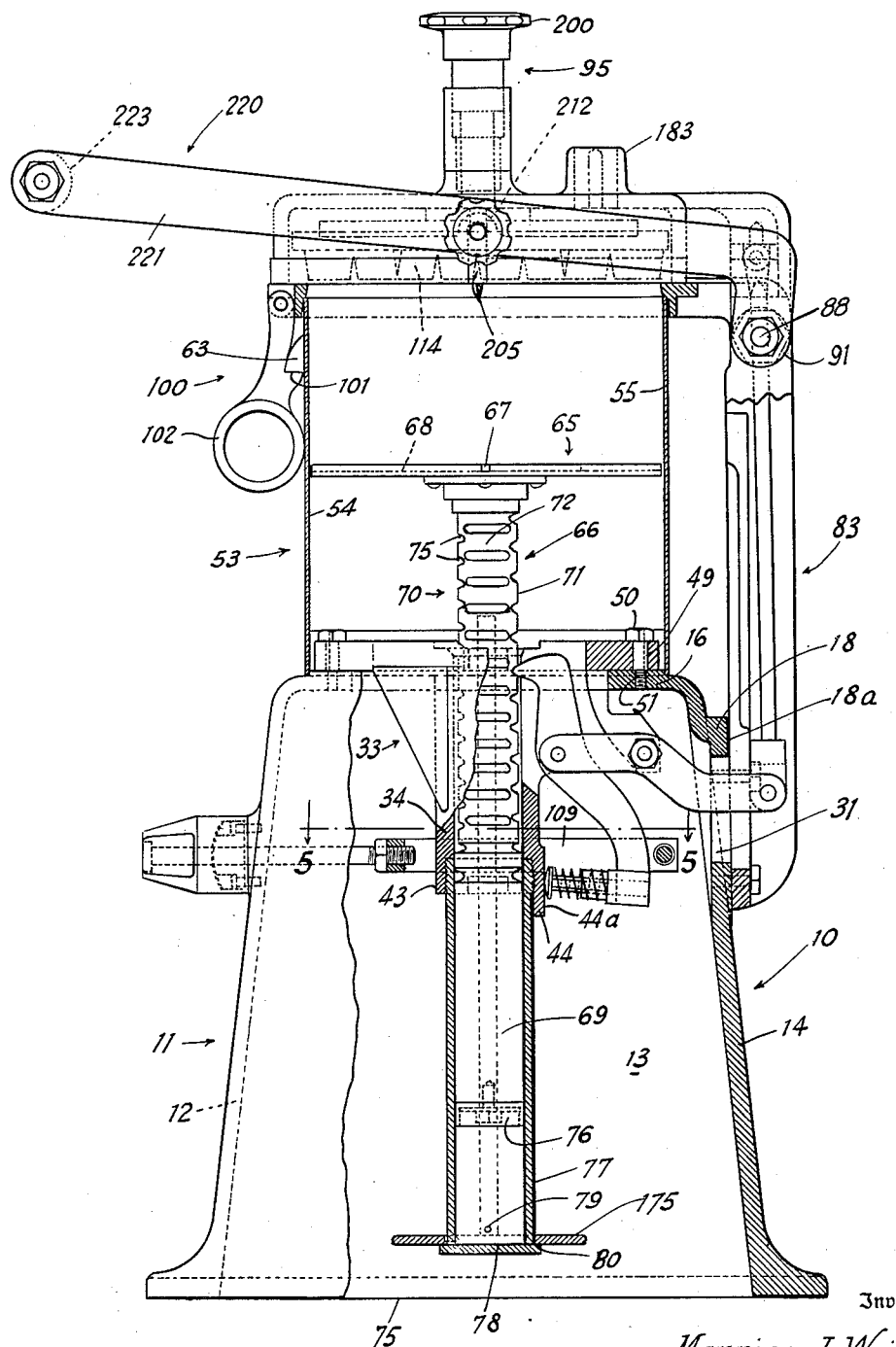
Figure 2:
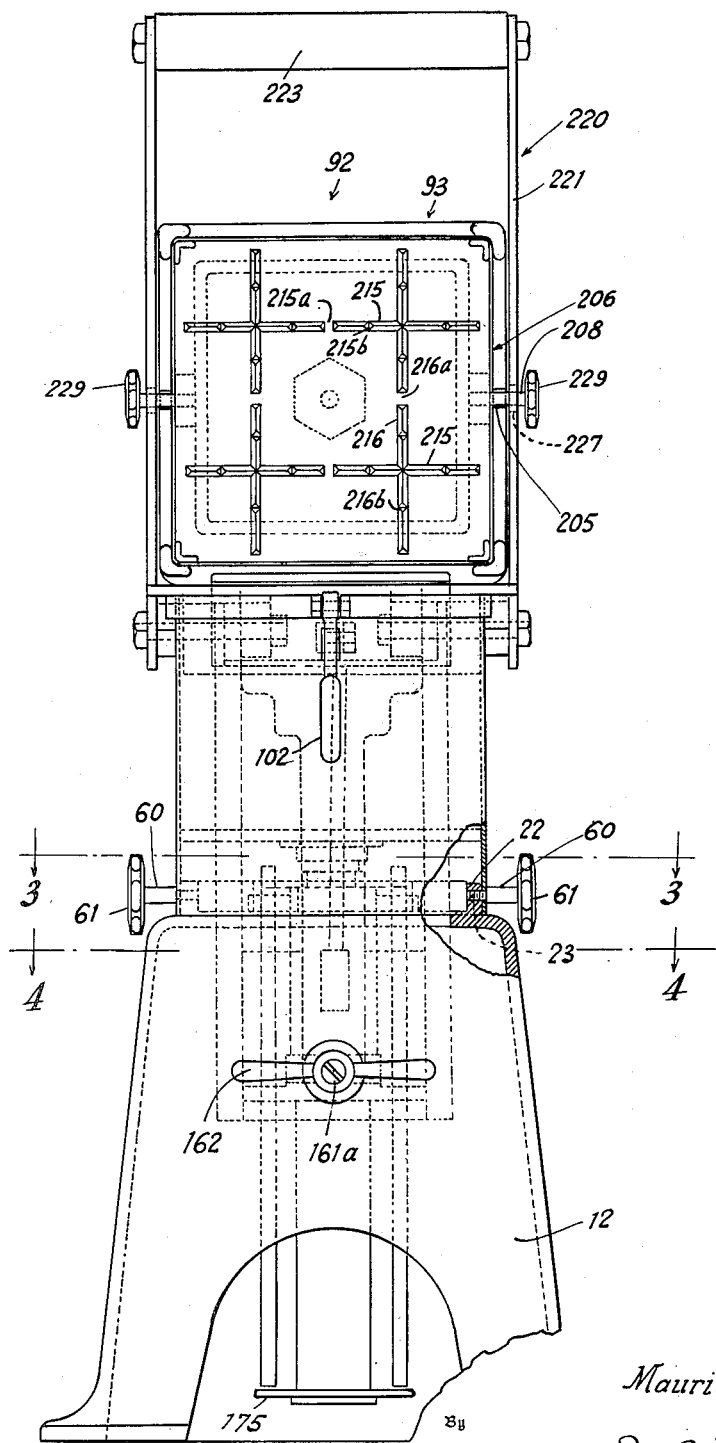
Fig. 2 is a front elevational view of the machine shown in Fig. 1, with the cover upstanding.
Figure 3:
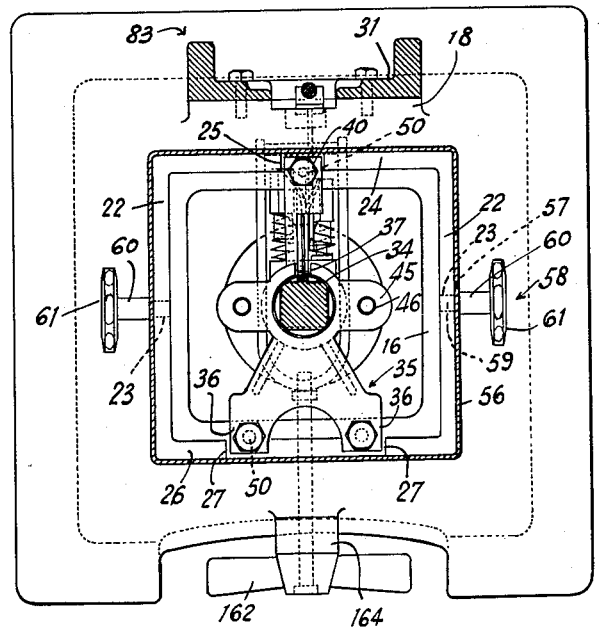
Fig. 3 is a cross-sectional view taken on line 3—3 of Fig. 2.
Figure 4:
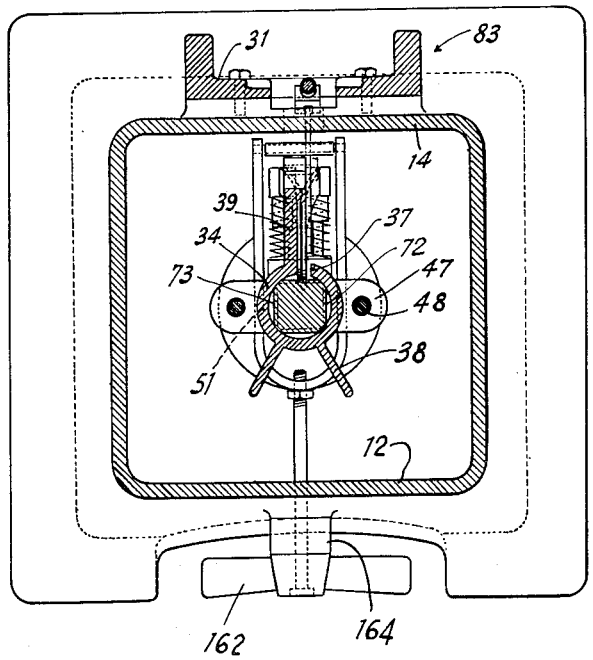
Fig. 4 is a cross-sectional view taken on line 4—4 of Fig. 2.

Referring now in detail to the drawing, 10 designates a machine embodying the invention. The same comprises a stand or base 11 having a front wall 12, side walls 13 and a rear wall 14. The walls 12, 13 and 14 may taper upwardly and inwardly. The stand has a flat horizontal flange 15 at its lower end. It is also formed with a top wall 16. Top wall 16 has a square opening 17. The rear wall 14 is formed with a rearwardly extending boss 18 near its upper end. The front wall 12 is formed with a cut out or hand opening 19 extending to the lower end of the base. Said front wall 12 is furthermore formed, above opening 19, with a boss 20 having a front vertical surface 21, for the purpose hereinafter appearing.

Extending upwardly from top wall 16 are upstanding side walls 22 formed with centrally located screw threaded openings 23, for the purpose hereinafter appearing.

Also extending upwardly from the top wall 16 is a rear wall 24 formed with a central slot 25 and a front wall 26 formed with a pair of spaced slots 27. The boss 18 is formed with a central vertical through opening 31. It is also formed with a plurality of screw threaded openings 32, there being a pair of such openings on each side of the slot 31. Said boss 18 has a rear vertical surface 18a.

Mounted on top wall 16 and projecting down into the stand, is a bracket 33. Said bracket 33 comprises a cylindrical sleeve portion 34 open at its lower end. Integrally formed with the sleeve 34 is a top flange 35 having a pair of forwardly projecting portions 36 projecting into the notches 27 in wall 26 and resting on the top wall 16. Sleeve 34 is formed at its rear side with a vertical slot 37. Flange 35 is connected to the sleeve 34 by inclined webs 38. Extending rearwardly from sleeve 34 and adjacent slot 37 is a web 39, from which there projects a lug 40 received within notch 25 and likewise resting on the top wall 16. Extending from web 39 rearwardly and below wall 16 is a projection 41 formed with a screw threaded opening 42. At the lower end of sleeve 34 is an internally screw threaded counterbored opening 43. Also at the rear of the sleeve is a downwardly extending projection 44 formed with a flat rear surface 44a for the purpose hereinafter appearing.

Sleeve 34 is furthermore provided at its upper end with a pair of oppositely extending ears 45 formed with vertical through openings 46. The ears 45 extend toward the side walls 22. Adjacent the lower end of the sleeve 34 are ears 47 aligned with ears 45 and formed with through openings 48 which are vertically aligned with the through openings 46. Lugs 36 and 40 are formed with vertical through openings 49 to receive set screws 50, the lower ends of which are screwed into threaded openings 51 in the top wall 16 which register with the openings 49. Thus, the set screws 50 serve to attach member 33 to the top wall 16 of the stand 11. The sleeve 34 is furthermore formed, just above the lower ears 47, with parallel, horizontal, diametrically opposed grooves 51 which are parallel to the side walls 22.

Mounted on the top wall 16 is a butter chamber 53. Butter chamber 53 may be of substantially square cross-section and has a front wall 54, rear wall 55 and side walls 56. Said butter chamber is open at its upper and lower ends. The lower end of the chamber is received over the walls 22, 24 and 26, that is, the inner surfaces of walls 54, 55 and 56 contact the outer surfaces of flanges or walls 26, 24 and 22, respectively. Adjacent the lower ends of the side walls 56 are through openings 57 registering with the screw threaded openings 23.

Means is provided to retain the butter chamber on the stand. To this end, there is provided for each side of the butter chamber, a retaining member 58 comprising a threaded end shank 59 passing through opening 57 and screwed into opening 23. Extending from the threaded shank 59 is a straight shank 60 contacting the outer surface of wall 56. On shank 60 is a hand wheel 61.

It will be obvious that upon unscrewing members 58, the butter chamber may be removed wholly from the stand.

The front wall of the butter chamber is formed near its upper end with a keeper 63 for the purpose hereinafter appearing.

Slidably mounted in the butter chamber 53 is a platform or plunger 65 from the lower side of which there extends downwardly, a stem 66. Stem 66 passes through the sleeve 34, whereas the platform 65 is slidably received within the butter chamber and is of somewhat smaller dimension. The top surface of platform 65 is formed with a pair of crossing centrally located grooves 67 and 68. The groove 67 is parallel to the front of the machine, whereas, the groove 68 is at right angles to groove 67. The major portion of stem 66 is of square cross-section, whereas the lower end 69 of the stem is a circular cross-section. The portion of stem 66 of square cross-section comprises four ratchet faces, the same being a front face 70, a rear face 71 and side faces 72 and 73.

On each face are equally spaced horizontal notches 75. However, the distance between adjacent notches on the four faces varies. Thus, for example, the notches on the front face 70 may be closer together. On face 72 the notches are somewhat more spaced apart. On face 71, the notches are still further spaced apart, and on face 73 they may be furthest spaced apart.

Attached to the lower end 69 of the stem 66 is a piston ring or wiper 76. Screwed into the lower screw threaded end 43 of sleeve 34 is a cylinder 77 closed by a bottom wall 78. Wall 78 is formed with one or more similar air outlet openings 79 near its lower end. The bottom wall 78 is formed with an annular outwardly extending flange 80. The lower end 69 of the stem, together with the wiper or piston ring slide within the cylinder 77. The piston ring 76 makes an airtight sliding connection with the inner surface of cylinder 77. Thus, when the platform 65 is allowed to fall within the cylinder 77, it will fall gently as the air beneath the stem 66 is trapped and can only escape through the small openings 79. The air cushions the fall of the piston.

Attached to the rear surface 18a of the boss 18 is a bracket 83. Said bracket 83 is formed with openings registering with the openings 32. Screws 84 extending through the openings in the bracket are screwed into the threaded openings 32 in the boss 18 for attaching the bracket 83 to the stand 11. Bracket 83 has side portions 85 and is formed with a notch 86 therebetween surrounding the slot 31 in the boss 18. Portions 85 of bracket 83 project to a height somewhat below the level of the upper end of the butter chamber 53. Said side members 85 are formed with horizontally aligned bearing openings 87. Extending through the openings 87 are a pair of horizontally aligned pivot bolts 88.

Pivoted to the inner ends of bolts 88 is a spreader member 90. Spreader member 90 is formed with apertured ears 91 through which the pivot bolts 88 extend. The ears 91 are at the inner sides of the upper ends of members 85. Extending from the ears 91 is a substantially rectangular frame 92 having a front portion 93, side portion 94 and a rear portion 95. The ears 91 extend from arms 96 either integrally formed or attached to the rear portion 95. Frame portion 92 is formed with an inner under surface or shoulder 96 adapted to contact the upper edge 97 of the butter chamber. Thus, the frame 92 has a flange overlying the upper edge of the butter chamber and a flange contacting the outer surface of the chamber and projecting downwardly.

Pivoted to the center of the front wall 93 is a latch member 100 provided with a hook 101 adapted to engage the keeper 63. On the latch 100 is a handle or knob 102.

Figure 6:
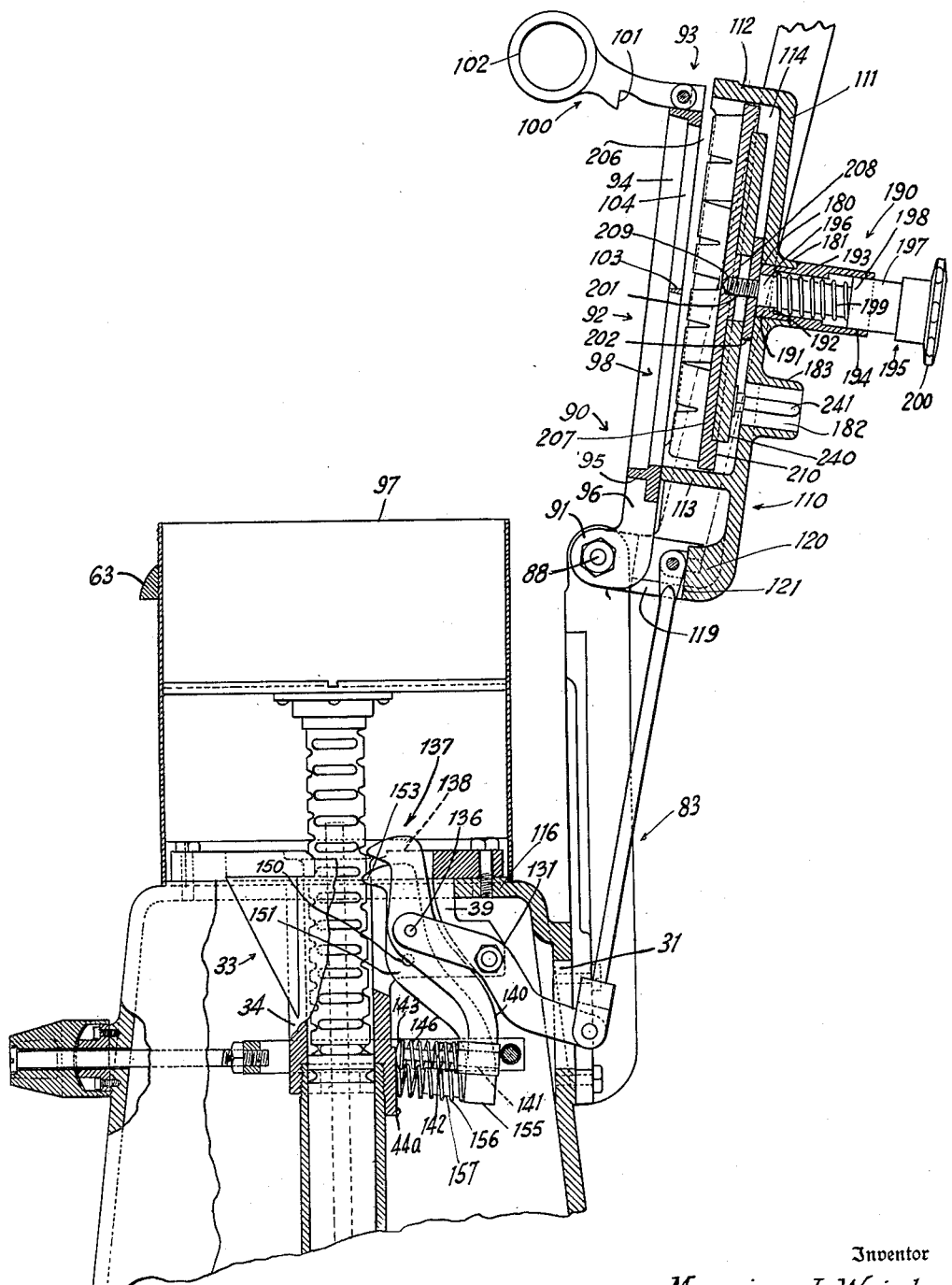
Fig. 6 is a side elevational view of the machine with the cover being in open position and the spreader frame in lifted position.

It will now be understood that the spreader member 90 may be swung from the vertical position shown in Fig. 6 to a horizontal position shown in Fig. 1, where it overlies the butter chamber. The side walls 94 are interconnected by a transverse cutter blade 103, equally distant from the front and rear walls 93 and 95. Likewise, the front and rear walls 93 and 95 are interconnected by a cutter blade 104 equally distant from the side walls 94 of the frame. The blades 103, 104 cross each other. They decrease in thickness towards their lower edges. They may be received in grooves 67, 68 of the platform when the latter is fully raised. Blades 103, 104 may be replaced by wires.

Also pivoted to the pivot bolts or pins 88 is a cover member 110. The cover 110 has a top wall 111, a front wall 112 extending down from the top wall, a rear wall 113 extending downwardly from the top wall, and side walls 114. The top wall 111 extends rearwardly beyond the rear wall 113, and extending downwardly from the top wall is a flange 116 provided with downwardly extending ears 117 formed with apertures 118 through which the bolts or pins 88 pass. Wall 116 is formed with a central notch 119. At the junction of walls 116 and 110 and above notch 119 is a thickened boss 120 having a flat horizontal undersurface 121. Said boss is formed with a screw threaded opening 122. Screwed thereunto is the threaded shank 123 of a member 124. Said member 124 is provided with a slot 125 forming ears 126. Said ears are apertured and carry a transverse horizontal pivot pin 127. Pivoted to the pivot pin 127 is the upper end of a link 128.

Screwed into the screw threaded opening 42 in projection 41 of web 39 is a screw 130. Pivoted thereto is a lever 131. Said lever 131 has a rearwardly projecting arm 132 projecting through the opening 31. The lower end of the link 128 is pivoted as at 133 to the rearward end 132 of arm 131.

It will now be observed that oscillating movement of the cover will cause oscillation of lever 131 about screw 130. Lever 131 also has a forwardly and upwardly projecting arm 135. Pivoted to said arm, as on pivot pin 136, is a lifting pawl 137 in the form of a lever. Said pawl 137 has an upwardly extending arm 138 formed with a forwardly projecting point 139. Pawl 137 also comprises a downwardly projecting arm 140, as found in Figure 6, formed with a through opening 141. Slidably mounted in the opening 141 is a shank 142 having a head 143 at its forward and contacting surface 44a. Between the head 143 and the lower end of lever arm 140 is a coil compression spring 146, which tends to rotate the lever pawl 137 in a counterclockwise direction about the pivot pin 136.

It will now be understood that as the cover is oscillated, lever 131 will likewise be oscillated for moving the pawl lever up and down, thereby causing head 143 to slide up and down on surface 44a.

It will be understood that the pointed portion 139 of the pawl lever 137 will engage in the notches of the rearwardly positioned face of the stem 66. As the cover is oscillated, the pawl 137 will be moved up and down successively, raising the platform through equal increments. The increments may, of course, be varied depending upon which face of the stem is at the rear.

Also pivoted to web 39, as on pivot 150, is a holding pawl 151 having at its upper end a pointed portion 153 adapted to engage the notches in the stem. At the lower end of the holding pawl 151, is a head 155. Between said head 155 and surface 45 is a coil compression spring 156. Head 155 is provided with projection 157 projecting into the spring 156. Thus, when the lifting pawl 137 is raised, the platform will be raised, and when said lifting pawl is lowered the holding pawl 151 will hold the platform in desired position.

Means is provided to simultaneously retract both the lifting and holding pawl, so that the platform may be permitted to either drop by gravity or to permit the platform to be quickly raised manually. To this end, boss 20 and front wall 12 are formed with a horizontal through opening 160, through which extends a horizontal pin 161, extending from front to rear. Rotatably mounted on the front end of the pin 161 is a handle 162. A head 161a on the front end of the pin keeps the handle from sliding movement on the pin. Handle 162 is formed with a rearwardly extending socket 163. Within the socket 163 are a pair of raised cams 164. Attached to the boss 20 and contacting surfaces 21 thereof is a sleeve 165 adapted to be received within socket 163 and formed with a pair of spaced cams 166. Upon rotating handle 162, the high parts of the cams 164, 166 contact so that the handle together with pin 161 is moved forwardly. As the handle is rotated further, the low portions of the cams contact, so that the handle 162, together with the pin 161 may be retracted rearwardly.

Attached to the rear end of the pin 161 is a yoke 168 comprising parallel side bars 169 which ride in the grooves 51. The side bars 169 are interconnected by a front cross bar 170 to which the rear end of the pin 161 is screwed. The rear ends of the bars 169 are interconnected by a transverse cross pin 171 carrying a roller sleeve 172. The roller sleeve 172 contacts the rear sides of the lower ends of the lifting and holding pawls.

Figure 7:
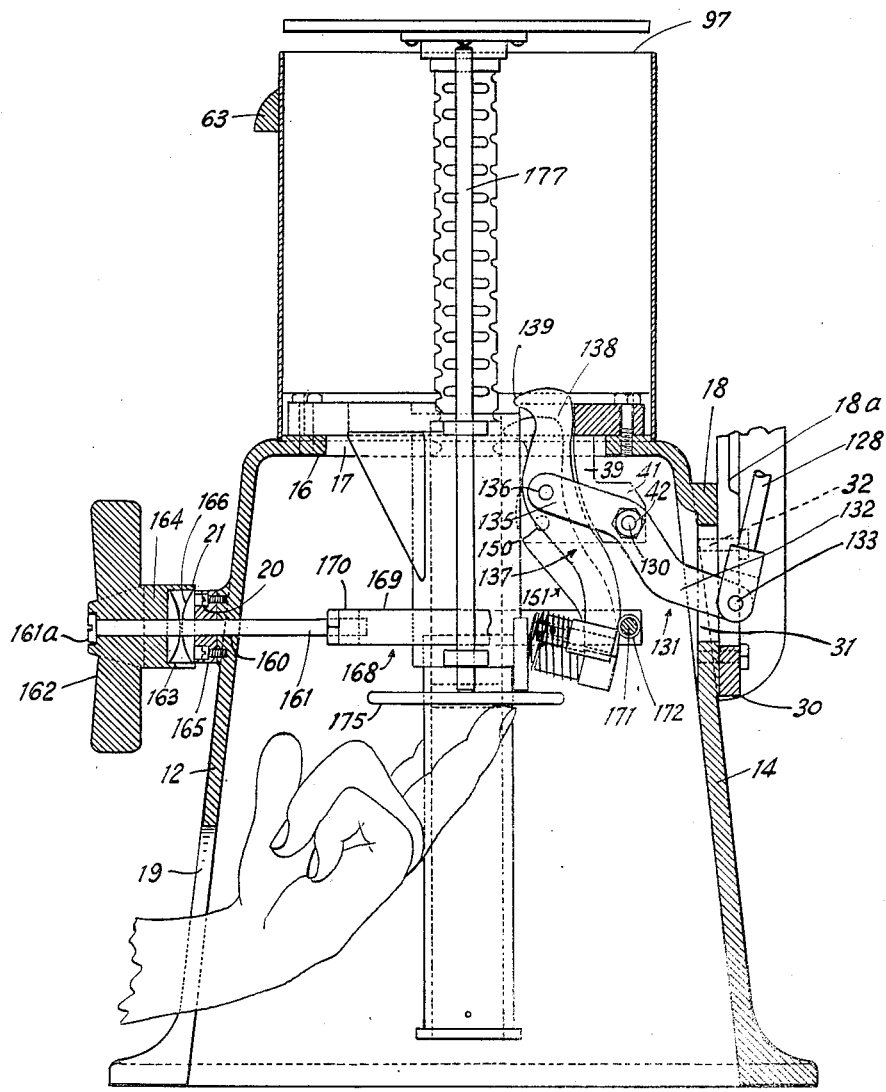
Fig. 7 is an axial cross-sectional view of the machine with parts broken away.

It will now be understood that in the vertical position of the handle 162, as shown in Fig. 7, the bars are swung into position where they are released from the stem of the platform. In the horizontal position of the handle, as shown in Fig. 1, the bars are in engagement with the stem. The springs 146 and 156 keep the lower ends of the pawls in engagement with the sleeves 172 and serve to retract the yoke when the handle is moved to releasing position. It will be understood that when the lifting and holding pawls are retracted so that they do not engage the stem of the platform, the platform may be lifted up or permitted to drop.

Means is provided to facilitate raising of the platform when the pawls are moved away from the stem. To this end, there is slidably mounted on the cylinder 77, a plate 175 which rests on the flange 30. Plate 175 is formed with a through opening loosely received on the cylinder 77. Extending through the openings 48 and 46 in the ears 47 and 45, are a pair of vertical rods 177. The lower ends of the rods rest on the plate 175. When it is desired to lift the platform, the operator may put his hand through the opening 19 in the front wall 12 of the stand. A pair of fingers may then engage the underside of plate 175 on opposite sides of the bottom wall 78 of cylinder 77. Plate 175 may then be raised, and the rods 177 will engage the underside of the platform and raise the platform together with its stem.

Referring now again to the cover member 110, it will be noted that the top wall 111 of said cover member is formed with a central through opening 180, and with a flange 181 surrounding said top wall. Said top wall is furthermore formed with a through opening 182 offset from the opening 180, and with a flange 183 surrounding said opening 182. Press fitted into the opening 180 is a sleeve 190 extending upwardly from the flange 181. Sleeve 190 is formed at its lower end with an opening 191 having a shoulder 192 at one end. Extending from opening 191 is an opening 193 of somewhat greater diameter, from which there extends an opening 194 of still greater diameter. Opening 194 extends to the upper end of sleeve 190. Slidably mounted within the sleeve 190 is a plunger 195. Said plunger 195 has a portion 196 slidably mounted within the opening 191. It is also formed with a portion 197 received in the opening 194. Portion 197 of the plunger is of greater diameter than plunger portion 196. Between the two portions 196, 197 is a shoulder 198. Surrounding portion 196 of the plunger, and interposed between shoulders 192 and 198, is a coil compression spring 199. At the top of the plunger 195 is a handle 200. Extending downwardly from plunger 195 is a screw threaded stem 201. Screwed to the stem 201 is a plate 202 contacting the underside of top wall 111 of the cover. It will be noted that the plunger 195 may be compressed to press the spring 199. The spring, however, tends to lift the plunger so that plate 202 will contact the underside of the cover top wall 111.

The side walls 114 of the cover are formed with notches 205 which extend to the lower edges of said side walls for the purpose hereinafter appearing.

Disposed within the cover is a cutter or impressor plate 206. Said impressor plate comprises a flat substantially rectangular wall 207 formed with a central upwardly extending boss 208 formed with a blind shaped opening 209. Said impressor plate is furthermore formed with an upwardly extending perimeter flange 210. At the sides of the flange are upwardly extending ears 212 formed with horizontal screw threaded openings registering with the notches 205. At the underside of the impressor plate are cutting blades 215, extending from side to side and cutting blades 216 extending from rear to rear. The cutting blades 215 are parallel to the blade 103 of the spreader and are located between the spreader blade 103 and the front and rear walls of the cover. The blades 216 are parallel to the blade 104 of the spreader, and are disposed between said blade and the sides of the cutter. The blades 215 and 216 are formed with central notches 215a adapted to receive the blade 104, whereas the blades 216 are formed with central notches 216a to receive the blade 103. Said blades 215 and 216 are, furthermore, formed with notches 215b and 216b, for the purpose hereinafter appearing.

Also pivoted to the pivot pins or bolts 88 is an operating handle member 220. Said member 220 comprises side bars 221, the rear ends of which are apertured to receive the pivot pins 88. The side bars 221 extend forwardly beyond the front of the cover. The forward ends of the side bars 221 are interconnected by an end transverse bar 223. The side bars 221 are formed with slots 227. Extending through said slots 227 are shanks 228 each formed with a finger head 229. Said shanks 228 extend through the notches 205 in the cover and at their inner ends are screw threaded portions 230, screwed into the threaded openings in the ears of the impressor plate.

It will now be understood that the impressor plate 206 may move vertically downwardly relative to the cover, whereas the cover can only rotate about its pivot. Thus, to close the cover, the handle bar 223 is grasped and the handle is rotated in a counterclockwise direction causing the cover to swing therewith. The spreader member 59 may first be swung into overlying position relative to the butter chamber and the latch 100 engaged with the keeper 63. After the cover member has contacted, the spreader member in superimposed position thereto, further movement of the handle in a counterclockwise direction will move the impressor plate vertically downwardly.

Between the impressor plate and the top wall 111 of the cover is a heating element 240. The heating element is formed with a central opening through which the threaded shank 201 of the plunger 195 passes. Said heating element is provided with prongs 241 projecting through the opening 182 for engagement with an electrical socket connector of an electrical cord, so that the heating element may be connected to a suitable source of electrical power.

The operation of the device described hereinabove will now be explained. The platform 65 is permitted to drop to the bottom of the butter chamber. A bulk or block of butter is placed in the butter chamber. The spreader is latched to the butter chamber. The handle member 220 is then swung in a counterclockwise direction causing the lifting pawl to be lowered. At the same time the impressor plate causes the blades 215 and 216 to cut into the top layer or portion of the bulk of butter. Also the blades 103, 104 of the spreader have cut into the top of the bulk of butter.

The handle 220 is then raised and during such operation the platform is lifted one increment causing the butter in the butter chamber to be raised a predetermined height above the upper edge 97 of the butter chamber. Thus the upper portion or layer of butter has been cut into 4 divisions by the blades 103, 104. Each of the four divisions has also been cut into 4 divisions by the blades 215, 216. The heater 240 heats the blades so that as the impressor or cutter is lifted, the butter will not stick thereto. Obviously, the impressor may be formed with any suitable number of blades 215, 216 so that the top layer of the butter block, will be divided into any desired number of pats or portions. After the handle has been lifted, the top layer or slab of the butter may be severed or removed by a remover or in any other manner.

The severed slab of butter will have been divided into pats, as will now be clearly understood. The operation described above may be repeated until all of the butter in the butter chamber has been divided into pats. It will be noted that the height or thickness of the slab may be varied depending upon the position of the faces of the stem relative to the stand, thus increasing or decreasing the number of pats to the pound.

The impressor or cutter plate is removably mounted in the cover, whereby different impressor plates may be mounted on the machine so as to permit varying the number of pats per slab and also varying the design. The heating element is also removably mounted in the cover adjacent the impressor plate and may be readily removed for cleaning. The raising of the butter in the butter chamber is accomplished by oscillation of the cover, and no separate operation is necessary to raise the butter.

It will be noted that the initial movement of the handle will cause swinging movement of the cover relative to the chamber, but continued rotation of the handle will cause vertical or up and down movement of the impressor plate so that the actual cutting of the butter is in a vertical up and down movement and not on an arc, whereby the butter will not be mutilated as it is impressed or cut.

It will be noted that the post or stem on the platform is of polygonal cross section and has ratchet notches on each face thereof. The distance between the notches on each face are different than the distance between notches on other faces. The platform may be removed so that it may be cleaned and also to bring any face of the stem or post to a predetermined plane. The movement of the lifting pawl is greater than the greatest distance between the notches on any face of the stem, but less than twice the distance between adjacent notches, so as to insure lifting of the stem one notch for each oscillation for the cover and prevent lifting of the stem two notches.

It will be noted that means are provided to withdraw both the lifting and holding pawls so as to permit the platform to be quickly dropped or raised. It will be noted that means is provided to permit dropping of the platform gently. Furthermore, the platform may be quickly raised manually.

It will be noted, furthermore, that the butter chamber is easily removable for cleaning purposes.

The function of the spreader, it will now be noted, is to position and retain the butter in the butter chamber and hold it down and also to cut the butter bulk into two or more pieces. Furthermore, the spreader frame resists adhesion of the butter to the impressor plate as the impressor plate is lifted up. The spreader frame, furthermore, resists lifting of the butter in the butter chamber when the remover frame cuts the top slab off the top of the butter. Furthermore, the provision of the blades on the spreader permits the impressor plate to be made without the center blades, thereby removing possibility of cavity suction or adhesion in the impressor plate which has heretofore been troublesome. Furthermore, by using the spreader frame as shown herein, the butter bulk is held central positioned should the butter bulk be less than the volume of the butter chamber. It will be noted, furthermore, that the impressor plate is constructed without a perimeter blade and all of the other blades in the impressor plate are formed with notches or grooves in order that the butter pats are formed with interconnecting portions which serve to bond the butter pats together so as to facilitate removal of the pats and also serve to resist fusion of the pats. Thus, the interconnecting portions formed where the notches in the impressor blades are cut, serve to keep the butter pats spaced from each other during the cutting and removing operation, and also after packaging for shipment.

Figure 10:
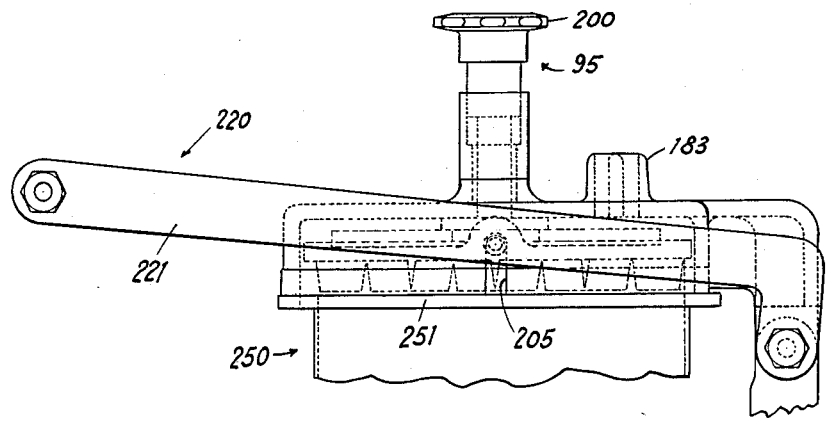
Fig. 10 is a side elevational view of the upper part of the machine embodying a modified construction; and showing the cover in position overlying the butter chamber, but with the impressor plate in up position.
Figure 11:
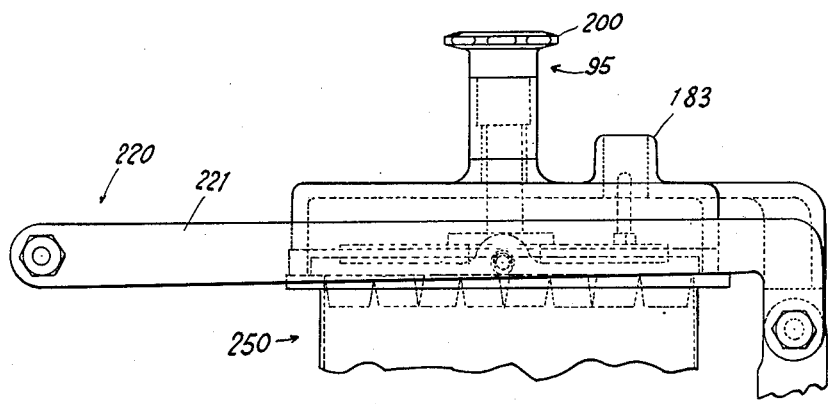
Fig. 11 is a view similar to Fig. 10, but showing the impressor plate down in cutting position.
Figure 5:
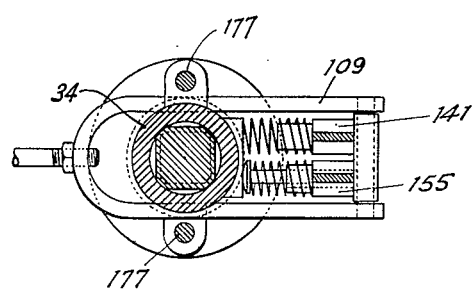
Fig. 5 is a cross-sectional view taken on line 5—5 of Fig. 1.
Figure 12:
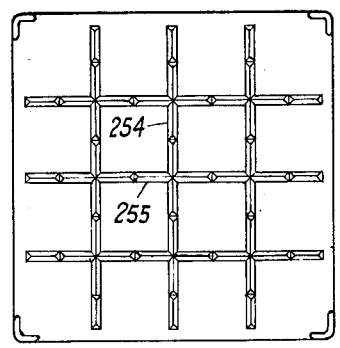
Fig. 12 is a bottom view of the impressor plate shown in the modifications of Figs. 10 and 11.

If desired, the spreader may be entirely omitted, in which event, there is provided a butter chamber 250, similar to the one described hereinabove except that keeper 63 is omitted and the butter chamber is furthermore formed with outwardly extending flanges 251 for engagement with the remover. Flanges 251 contact the lower edge of the side walls 112, 113, 114 of the cover 110. In the event that the spreader frame is omitted, as shown in Figs. 10 and 11, the impressor plate or cutter shown in Fig. 12, will have central blades 254 and 255, in addition to the other blades, as described hereinabove.

It will thus be seen that there is provided a device in which the several objects of this invention are achieved, and which is well adapted to meet the conditions of practical use.

As various possible embodiments might be made of the above invention, and as various changes might be made in the embodiment above set forth, it is to be understood that all matter herein set forth or shown in the accompanying drawing is to be interpreted as illustrative and not in a limiting sense.

Having thus described my invention, I claim as new and desire to secure by Letters Patent:

1. A machine for making pats comprising means defining a chamber open at one end, said chamber means being adapted to contain material for making pats, a piston in said chamber means, an impressor member located over the open end of the chamber means and movable relative thereto, to impress a surface of said material exposed at the open end of said chamber means, and means connected to said impressor member for movement thereby, to move said piston for forcing material within the chamber means beyond the open end of said chamber means.

2. A machine for making pats comprising means defining a chamber open at one end, said chamber means being adapted to contain material for making pats, a piston in said chamber means, an impressor member located over the open end of the chamber means and movable relative thereto, to impress a surface of said material exposed at the open end of said chamber means, means connected to said impressor member for movement thereby, to move said piston for forcing material within the chamber means beyond the open end of said chamber means, and means for retaining said piston in any position to which it is moved.

3. A machine for making pats comprising means defining a chamber open at one end, said chamber means being adapted to contain material for making pats, a piston in said chamber means, an impressor member located over the open end of the chamber means and movable relative thereto, to impress a surface of said material exposed at the open end of said chamber means, means connected to said impressor member for movement thereby, to move said piston for forcing material within the chamber means beyond the open end of said chamber means, means for retaining said piston in any position to which it is moved, and means to render said retaining means and moving means inoperative whereby to allow free movement of said piston within said chamber means.

4. A device of the character described comprising a stand, means defining a chamber mounted thereon and adapted to contain material for making pats, said chamber means being open at its upper end, a piston within said chamber means, a stem on said piston projecting downwardly into said stand, a cover pivoted relative to said stand and having means to cover the upper end of said chamber means, an impressor member slidably mounted relative to said cover and having means to impress a surface of said material at the open end of the chamber means, and means connected to said cover for movement thereby, and engaging said stem for raising said piston a predetermined height for each oscillation of said cover.

5. A device of the character described comprising a stand, means defining a chamber mounted thereon and adapted to contain material for making pats, said chamber means being open at its upper end, a piston within said chamber means, a stem on said piston projecting downwardly into said stand, a cover pivoted relative to said stand and having means to cover the upper end of said chamber means, an impressor member slidably mounted relative to said cover and adapted to impress a surface of said material at the open end of said chamber means, means connected to said cover for movement thereby, and engaging said stem, for raising said piston a predetermined height for each oscillation of said cover, and a handle pivoted relative to said stand, and means interconnecting said handle with said impressor member.

6. A device of the character described comprising a stand, means defining a chamber mounted thereon and adapted to contain material for making pats, said chamber means being open at its upper end, a piston within said chamber means, a stem on said piston projecting downwardly into said stand, a cover pivoted relative to said stand and having means to cover the upper end of said chamber means, an impressor member slidably mounted relative to said cover and adapted to impress a surface of said material at the open end of said chamber means, means connected to said cover for movement thereby, and engaging said stem, for raising said piston a predetermined height for each oscillation of said cover, a handle pivoted relative to said stand, means interconnecting said handle with said impressor member, and heating means between said impressor member and cover, said cover being formed with an opening, and electric connector prongs on said heating means projecting through said opening in said cover.

7. A device of the character described comprising a stand, means defining a chamber mounted thereon and adapted to contain material for making pats, said chamber means being open at its upper end, a piston within said chamber means, a stem on said piston projecting downwardly into said stand, a cover pivoted relative to said stand and having means to cover the upper end of said chamber means, an impressor member slidably mounted relative to said cover and adapted to impress a surface of said material at the open end of said chamber means, means connected to said cover for movement thereby, and engaging said stem, for raising said piston a predetermined height for each oscillation of said cover, a handle pivoted relative to said stand, means interconnecting said handle with said impressor member, heating means between said impressor member and cover, said cover being formed with an opening, electric connector prongs on said heating means projecting through said opening in said cover, and spring means to normally raise said impressor member within said cover.

8. In combination, means defining a chamber open at its upper end, a piston within said chamber means, a spreader member at the upper end of said chamber means and having one or more cutting elements traversing the open end of said chamber means, whereby a block of material within the chamber may be pressed by the piston through the open end of the chamber means to be divided into sections by the blade or blades on the spreader member, and an impressor movably mounted relative to the spreader member and chamber means, and being formed with blades for dividing the divided sections of the block into smaller sections, and means connected to the impressor for movement thereby, to push the piston up in said chamber means for pressing the block of material through the open end of the chamber means.

9. In combination, means defining a chamber, a piston within said chamber means, said chamber means being open at one end, a spreader member pivoted relative to said chamber means and being formed with one or more blades adapted to traverse the open end of said chamber means to divide a block of material within the chamber means and above the piston into sections, a cover member pivoted relative to the chamber means and being adapted in one position to overlie said spreader member, an impressor member within the cover and above the spreader, and said impressor member having blades to cut the divided sections into smaller sections, and means connected to said cover member for movement thereby, to move the piston up in the chamber means for pushing the block of material therein, up above the open end of the chamber means.

10. In combination, means defining a chamber, a piston within said chamber means, said chamber means being open at one end, a spreader member pivoted relative to said chamber means and being formed with one or more blades adapted to traverse the open end of said chamber means to divide a block of material within the chamber means and above the piston into sections, a cover member pivoted relative to the chamber means and being adapted in one position to overlie said spreader member, an impressor member within the cover and above the spreader, and said impressor member having blades to cut the divided sections into smaller sections, said impressor member being slidable relative to said cover, and a handle member pivoted relative to said chamber means and having a pivotal connection with said impressor member, and means connected to said cover member for movement thereby, to move the piston up in the chamber means for pushing the block of material therein, up above the open end of the chamber means.

11. A device of the character described comprising a stand having an opening at its upper end, means defining a chamber mounted on the stand, said chamber means being open at its upper end, a piston within the chamber means, a stem on the piston projecting down through the opening in the upper end of the stand, a bracket on said stand and projecting upwardly therefrom, a cover for the upper end of said chamber means pivoted to said bracket, a lever pivoted to the stand, a link connecting one arm of said lever with said cover at a point spaced from the point where the cover is pivoted to the bracket, a lifting pawl pivoted to the other arm of said lever, said stem being formed with a plurality of spaced notches adapted to be engaged by said pawl.

12. A device of the character described comprising a stand having an opening at its upper end, means defining a chamber mounted on the stand, said chamber means being open at its upper end, a piston within the chamber, a stem on the piston projecting down through the upper end of the stand, a bracket on said stand and projecting upwardly therefrom, a cover for the upper end of said chamber pivoted to said bracket, a lever pivoted to the stand, a link connecting one arm of said lever with said cover at a point spaced from the point where the cover is pivoted to the bracket, a lifting pawl pivoted to the other arm of said lever, said stem being formed with a plurality of spaced notches adapted to be engaged by said pawl, and a holding pawl pivoted within said stand and adapted to engage in said notches to retain the piston at any height to which it is raised.

13. A device of the character described comprising a stand having an opening at its upper end, means defining a chamber mounted on the stand, said chamber means being open at its upper end, a piston within the chamber means, a stem on the piston projecting down through the upper end of the stand, a bracket on said stand and projecting upwardly therefrom, a cover for the upper end of said chamber means pivoted to said bracket, a lever pivoted to the stand, a link connecting one arm of said lever with said cover at a point spaced from the point where the cover is hinged to the bracket, a lifting pawl pivoted to the other arm of said lever, said stem being formed with a plurality of spaced notches adapted to be engaged by said pawl, a holding pawl pivoted within said stand and adapted to engage in said notches to retain the piston at any height to which it is raised, and means to retain said pawls in engagement with said notches.

14. A device of the character described comprising a stand having an opening at its upper end, means defining a chamber mounted on the stand, said chamber means being open at its upper end, a piston within the chamber means, a stem on the piston projecting down through the upper end of the stand, a bracket on said stand and projecting upwardly therefrom, a cover for the upper end of said chamber means pivoted to said bracket, a lever pivoted to the stand, a link connecting one arm of said lever with said cover at a point spaced from the point where the cover is hinged to the bracket, a lifting pawl pivoted to the other arm of said lever, said stem being formed with a plurality of spaced notches adapted to be engaged by said pawl, a holding pawl pivoted within said stand and adapted to engage in said notches to retain the piston at any height to which it is raised, means to retain said pawls in engagement with said notches, and means to retract said pawls to retain them out of engagement with respect to said notches.

15. A machine of the character described comprising means defining a chamber, a piston slidable within said chamber means, a stem on said piston, said stem being formed with a plurality of longitudinal faces, each face being formed with equally spaced notches, the distance between adjacent notches on the various faces being different, means to impress soft material within the chamber means and projected above the chamber means by the piston, and means controlled by said impressing means and cooperating with the notches in any selected one of said faces for lifting said piston.

16. A machine of the character described, comprising a stand, means defining a chamber mounted thereon, said chamber means being open at its upper end, a piston within the chamber means, a piston stem on the piston and projecting downwardly into the stand, a cylinder within the stand and receiving the lower end of said stem, said cylinder being formed with an air escape opening adjacent its lower end, and means on the stem to engage the inner surface of said cylinder whereby to cushion the fall of the stem within said cylinder, a plate slidably mounted on and surrounding said cylinder, and rods interposed between said plate and the underside of said piston, and guide means within the stand through which said rods slide, whereby upon lifting up the plate the rods will push the piston upwardly.

17. A machine of the character described, comprising a stand, means defining a chamber mounted thereon, a piston within the chamber means, a stem on the piston projecting down into said stand, said stem being formed with ratchet notches, a bracket on the stand, a cover pivoted to said bracket, impressor means in the cover, a lever pivoted within said stand, a link interconnecting one arm of said lever with said cover, a pawl pivoted to the other arm of said lever, spring means to retain the pawl in engagement with a notch in said stem, a yoke slidably mounted within said stand at right angles to said stem, and a handle at the front of the stand having means to slidably move said yoke, and said yoke engaging said pawl to move said pawl against said spring means out of engagement with respect to said stem.

18. A machine of the character described, comprising a stand, means defining a chamber mounted thereon, a piston within the chamber means, a stem on the piston projecting down into said stand, said stem being formed with ratchet notches, a bracket on the stand, a cover pivoted to said bracket, impressor means in the cover, a lever pivoted within said stand, a link interconnecting one arm of said lever with said cover, a pawl pivoted to the other arm of said lever, spring means to retain the pawl in engagement with a notch in said stem, a yoke slidably mounted within said stand at right angles to said stem, a handle at the front of the stand having means to slidably move said yoke, said yoke engaging said pawl to move said pawl against said spring means out of engagement with respect to said stem, and a holding pawl, spring means to retain said holding pawl in engagement with one of said notches, and said yoke engaging said holding pawl to move said holding pawl out of engagement with respect to said stem simultaneously with the retraction of said lifting pawl out of engagement with respect to said stem.

19. A device of the character described comprising means defining a chamber having an open end, a piston in said chamber means, means to progressively move the piston towards the open end of the chamber means predetermined distances, and means at the open end of the chamber means to divide material pressed by the piston beyond the open end of the chamber means, into sections, and means to interconnect the piston moving means to the dividing means for actuation thereby.

20. A device of the character described comprising means defining a chamber open at one end, a piston in said chamber means, means mounted for oscillation relative to said chamber, impressor means on said oscillatable means, means connected to said oscillatable means for movement thereby, for progressively moving the piston in the chamber means a predetermined distance, as said oscillatable means is oscillated, and means to render said piston moving means inoperative, to permit the piston to move in the chamber means free of said moving means.

21. A device of the character described comprising means defining a chamber open at one end, a piston in said chamber means, means mounted for oscillation relative to said chamber means, means connected to said oscillatable means for movement thereby, for progressively moving the piston in the chamber means a predetermined distance, as said oscillatable means is oscillated, means to render said piston moving means inoperative, to permit the piston to move in the chamber means free of said moving means, and means to cushion the movement of the piston when said moving means is rendered inoperative, and means on said oscillating means to impress material pushed by the piston above the upper end of said chamber means.

22. A machine for making pats comprising means movable relative to said chamber means, defining a chamber open at one end, a piston in said chamber means, an impressor member adapted to impress material projected from said chamber means beyond its open end, means connected to said impressor member for movement thereby to move said piston for forcing material within the chamber means beyond the open end of said chamber, means for retaining said piston in any position to which it is moved, and means for rendering said moving means and retaining means inoperative to permit said piston to drop by gravity, and means to cushion the drop of said piston when said moving means and retaining means are rendered inoperative.

23. A device of the character described comprising a stand, means defining a chamber on the upper end of the stand and extending upwardly therefrom and being open at the top, a piston movable within the chamber up and down, a piston stem attached to the piston and extending downwardly therefrom, a bracket fixed to the stand and extending upwardly therefrom, a cover pivoted to the bracket about a horizontal axis and adapted to be moved into overlying position above the upper end of the chamber means, a lever pivoted to the stand and having oppositely extending arms, a link pivoted at one end to one of said arms, means to pivotally connect the other end of said link to the cover about an axis parallel to and spaced from the axis about which the cover is pivoted to the bracket, a handle member pivoted to the bracket about the pivotal axis of the cover to the bracket, a pawl pivoted to the other arm of said lever, said stem being formed with spaced notches engageable by the pawl, spring means to press the pawl into engagement with the stem, an impressor within the cover and means to connect said impressor to the handle member whereby upon lifting the handle the cover is swung open and the lever is turned to cause the pawl to lift the piston and whereby upon lowering the handle the cover is swung down into overlying position above the chamber means and the lever is turned in an opposite direction to lower the pawl relative to the stem of the piston to engage the lower notch therein.

24. A device of the character described comprising a stand, means defining a chamber on the upper end of the stand and extending upwardly therefrom and being open at the top, a piston movable within the chamber up and down, a piston stem attached to the stand and extending upwardly therefrom, a cover pivoted to the bracket about a horizontal axis and adapted to be moved into overlying position above the upper end of the chamber means, a lever pivoted to the stand and having oppositely extending arms, a link pivoted at one end to one of said arms, means to pivotally connect the other end of said link to the cover about an axis parallel to and spaced from the axis about which the cover is pivoted to the bracket, a handle member pivoted to the bracket about the pivotal axis of the cover to the bracket, a pawl pivoted to the other arm of said lever, said stem being formed with spaced notches engageable by the pawl, spring means to press the pawl into engagement with the stem, an impressor within the cover and means to connect said impressor to the handle member whereby upon lifting the handle the cover is swung open and the lever is turned to cause the pawl to lift the piston and whereby upon lowering the handle the cover is swung down into overlying position above the chamber means and the lever is turned in an opposite direction to lower the pawl relative to the stem of the piston to engage the lower notch therein, a second pawl pivoted within the stand and spring means to retain the second pawl in engagement with the stem whereby to retain the stem and piston against downward movement while the first mentioned pawl is being lowered.

25. A device of the character described comprising a stand, means defining a chamber on the upper end of the stand and extending upwardly therefrom and being open at the top, a piston movable within the chamber up and down, a piston stem attached to the stand and extending upwardly therefrom, a cover pivoted to the bracket about a horizontal axis and adapted to be moved into overlying position above the upper end of the chamber means, a lever pivoted to the stand and having oppositely extending arms, a link pivoted at one end to one of said arms, means to pivotally connect the other end of said link to the cover about an axis parallel to and spaced from the axis about which the cover is pivoted to the bracket, a handle member pivoted to the bracket about the pivotal axis of the cover to the bracket, a pawl pivoted to the other arm of said lever, said stem being formed with spaced notches engageable by the pawl, spring means to press the pawl into engagement with the stem, an impressor within the cover and means to connect said impressor to the handle member whereby upon lifting the handle the cover is swung open and the lever is turned to cause the pawl to lift the piston and whereby upon lowering the handle the cover is swung down into overlying position above the chamber means and the lever is turned in an opposite direction to lower the pawl relative to the stem of the piston to engage the lower notch therein, a second pawl pivoted within the stand and spring means to retain the second pawl in engagement with the stem whereby to retain the stem and piston against downward movement while the first mentioned pawl is being lowered, and a divider mounted for pivotal movement about the pivotal axis of the cover to the bracket and being adapted to overlie the upper end of the chamber means and between the chamber means and the cover, and said divider having cutter means traversing the opening at the upper end of the chamber means.

26. A device of the character described comprising a stand, means defining a chamber on the upper end of the stand and extending upwardly therefrom and being open at the top, a piston movable within the chamber up and down, a piston stem attached to the stand and extending upwardly therefrom, a cover pivoted to the bracket about a horizontal axis and adapted to be moved into overlying position above the upper end of the chamber means, a lever pivoted to the stand and having oppositely extending arms, a link pivoted at one end to one of said arms, means to pivotally connect the other end of said link to the cover about an axis parallel to and spaced from the axis about which the cover is pivoted to the bracket, a handle member pivoted to the bracket about the pivotal axis of the cover to the bracket, a pawl pivoted to the other arm of said lever, said stem being formed with spaced notches engageable by the pawl, spring means to press the pawl into engagement with the stem, an impressor within the cover and means to connect said impressor to the handle member whereby upon lifting the handle the cover is swung open and the lever is turned to cause the pawl to lift the piston and whereby upon lowering the handle the cover is swung down into overlying position above the chamber means and the lever is turned in an opposite direction to lower the pawl relative to the stem of the piston to engage the lower notch therein, a second pawl pivoted within the stand and spring means to retain the second pawl in engagement with the stem whereby to retain the stem and piston against downward movement while the first mentioned pawl is being lowered, and a divider mounted for pivotal movement about the pivotal axis of the cover to the bracket and being adapted to overlie the upper end of the chamber means and between the chamber means and the cover, and said divider having cutter means traversing the opening at the upper end of the chamber means, and said impressor being slidable relative to the cover, and spring means to cause the impressor to move relative to the cover.

27. A machine for making pats comprising means defining a chamber open at one end, said chamber means being adapted to contain material for making pats, a piston in said chamber means, a member pivoted relative to said chamber means, means connected to said member for successively raising the piston within the chamber upon successively oscillating said member, and an impressor on said member and movable therewith to and away from a position overlying said chamber.

28. A machine for making pats comprising means defining a chamber open at its upper end, a piston within the chamber, a cover pivoted for oscillation from a position above the open end of the chamber means upwardly therefrom, a piston within the chamber means, means connected to said cover to move the piston within the chamber, an impressor within the cover and slidable relative thereto, and a handle pivoted on the pivotal axis of the cover and means to connect the impressor to the handle.

29. A machine for making pats comprising means defining a chamber open at its upper end, a piston within the chamber, a cover pivoted for oscillation from a position above the open end of the chamber means upwardly therefrom, a piston within the chamber means, means connected to said cover to move the piston within the chamber, an impressor within the cover and slidable relative thereto, and a handle pivoted on the pivotal axis of the cover and means to connect the impressor to the handle, and spring means interposed between the impressor and the cover.

30. A machine for making pats comprising means defining a chamber open at its upper end, a piston within the chamber, a cover pivoted for oscillation from a position above the open end of the chamber means upwardly therefrom, a piston within the chamber means, means connected to said cover to move the piston within the chamber, an impressor within the cover and slidable relative thereto, and a handle pivoted on the pivotal axis of the cover and means to connect the impressor to the handle, spring means interposed between the impressor and the cover, and a divider pivoted about the pivotal axis of the cover and the handle and disposed between the chamber and cover and having cutting blades traversing the open end of the chamber.

31. A device of the character described comprising a stand, means defining a chamber thereon open at its upper end, said chamber means being adapted to contain a material for making pats, a piston slidably mounted in the chamber means, a member pivoted relative to the stand, means on said member overlying the open end of the chamber means and movable relative to said member to impress the top surface of the material within the chamber means, and means connected to said member for movement thereby for raising said piston within said chamber means predetermined distances upon successively pivotally moving said member, for progressively projecting material in said chamber means to a position above said chamber means.

32. A device of the character described comprising means defining a chamber open at one end, a piston in said chamber means, an impressor member comprising means to impress material projected from said chamber means, beyond its open end, means to connect said impressor member for movement from impressing position over the open end of the chamber means to a position away from said impressing position, and means connected to the impressor member to progressively move said piston toward the open end of the chamber means, predetermined selected distances, as said impressor means is repeatedly moved to impressing position and away therefrom, whereby to progressively project material within the chamber means predetermined distances beyond the open end of said chamber.

MAURICE J. WEINBERG.

REFERENCES CITED

The following references are of record in the file of this patent:

UNITED STATES PATENTS

| Number | Name | Date |
|---|---|---|
| Re. 10,130 | Coates et al. | June 6, 1882 |
| 109,070 | Stern et al. | Nov. 8, 1870 |
| 401,795 | Schumacher et al. | Apr. 23, 1889 |
| 526,902 | Hucks, Jr. | Oct. 2, 1894 |
| 689,186 | Heisler | Dec. 17, 1901 |
| 2,021,340 | Tripolitis | Nov. 19, 1935 |
| 2,323,523 | Doering et al. | July 6, 1943 |
| 2,373,781 | Richardson | Apr. 17, 1945 |

FOREIGN PATENTS

| Number | Country | Date |
|---|---|---|
| 24,297 | Great Britain | Dec. 18, 1895 |
| 282,258 | Germany | Feb. 20, 1915 |
| 669,478 | France | Aug. 5, 1929 |